(12) United States Patent
Washino et al.

(10) Patent No.: US 7,384,294 B2
(45) Date of Patent: Jun. 10, 2008

(54) CONNECTOR FOR SIM

(75) Inventors: Kiyoshi Washino, Kanagawa (JP);
Satoru Kihira, Kanagawa (JP);
Tsuyoshi Fukami, Kanagawa (JP)

(73) Assignee: J.S.T. Mfg. Co., Ltd., Osaka (JP)

( * ) Notice: Subject to any disclaimer, the term of this patent is extended or adjusted under 35 U.S.C. 154(b) by 0 days.

(21) Appl. No.: 11/600,061

(22) Filed: Nov. 16, 2006

(65) Prior Publication Data
US 2007/0117463 A1 May 24, 2007

(30) Foreign Application Priority Data
Nov. 24, 2005 (JP) .............................. 2005-339293

(51) Int. Cl.
*H01R 13/62* (2006.01)
(52) U.S. Cl. .................................................. 439/326
(58) Field of Classification Search ................ 439/326, 439/331, 341, 630
See application file for complete search history.

(56) References Cited

U.S. PATENT DOCUMENTS

| | | | | |
|---|---|---|---|---|
| 5,603,629 | A * | 2/1997 | DeFrasne et al. ........... | 439/331 |
| 5,813,878 | A * | 9/1998 | Kuwata et al. .............. | 439/326 |
| 6,095,868 | A * | 8/2000 | Hyland et al. .............. | 439/630 |
| 6,174,188 | B1 * | 1/2001 | Martucci ..................... | 439/326 |
| 6,210,193 | B1 * | 4/2001 | Ito et al. ..................... | 439/326 |
| 6,743,035 | B1 * | 6/2004 | Yang .......................... | 439/326 |
| 6,913,479 | B1 * | 7/2005 | Su et al. ..................... | 439/326 |
| 6,951,472 | B2 * | 10/2005 | Shih .......................... | 439/326 |
| 7,137,562 | B2 * | 11/2006 | West et al. ................. | 235/486 |
| 2002/0094726 | A1 * | 7/2002 | Akagi et al. ................ | 439/630 |

FOREIGN PATENT DOCUMENTS

| | | |
|---|---|---|
| JP | H10-012324 A | 1/1998 |
| JP | H10-144422 A | 5/1998 |
| JP | 2000-200647 A | 7/2000 |
| JP | 2003-059588 A | 2/2003 |
| JP | 2004-071353 A | 3/2004 |

* cited by examiner

*Primary Examiner*—T. C. Patel
*Assistant Examiner*—Vladimir Imas
(74) *Attorney, Agent, or Firm*—Rader, Fishman & Grauer, PLLC

(57) ABSTRACT

A connector includes a plurality of contacts electrically connected to a plurality of connection terminals of an IC card, a housing disposed with the contacts, and a cover having a first end coupled to the housing in a reclosable manner and a second end into which the IC card can be inserted and stored. The cover includes a main surface covering an insulated surface of the IC card and a pair of supports formed at both sides of the main surface. The pair of supports are formed with a pair of rectangular grooves serving to slidably guide the IC card and pairs of claws facing the main surface. When closing the cover, the IC card is biased by the contacts so that the connection terminals separate from the pairs of claws.

15 Claims, 11 Drawing Sheets

CONNECTOR FOR SIM

This application is based on and claims the benefit of priority from Japanese Patent Application No. 2005-339293, filed on Nov. 24, 2005, the content of which is incorporated herein by reference.

BACKGROUND OF THE INVENTION

1. Field of the Invention

The present invention relates to a connector for electric connection, and more particularly, to the structure of a connector for SIM (Subscriber Identify Module) cards applied to cellular phones, etc.

2. Related Art

In recent years, SIM-card attachable cellular phones are widely used. The SIM card is an IC card on which contractor information published by a telephone company is recorded, and is used for identification of a user by being inserted into a cellular phone. For example, after purchasing an SIM card, a user can immediately use the card by attaching it to a cellular phone. The user can also use another cellular phone with the same telephone number by changing an SIM card. Moreover, the user can freely use a plurality of SIM cards with the same cellular phone.

As for a connector for such SIM card, a connector for an IC card has been invented which allows easy attachment/detachment of the IC card such as SIM card or the like, and prevents disengagement of the IC card (refer, for example, to Japanese Unexamined Patent Application Publication No. 2004-071353 (Patent Document 1)).

FIG. 12 is a perspective external view showing an example of connector of Patent Document 1 with a cover opened. FIG. 12 corresponds to FIG. 3 of Patent Document 1. As shown in FIG. 12, a connector 7 is shaped roughly like a flat rectangle as a whole. The connector 7 includes a housing 70 as a pedestal and a cover 80 having one end rotatably supported by the housing 70. The housing 70 and cover 80 have substantially the same size.

Referring to FIG. 12, when inserting an IC card 9 into the connector 7, the cover 80 is opened to insert the IC card 9 into an opening 80a of the cover 80 from the direction of arrow B. On the other hand, when removing the IC card 9 from the cover 80, the IC card 9 is drawn to the direction of arrow C with the cover 80 opened. After inserting the IC card 9 into the cover 80, by closing and sliding the cover 80 in the direction of arrow A2, the cover 80 becomes in the locked state. Then, a plurality of contacts 71 and a plurality of connection terminals 9a of the IC card 9 make contact with each other to maintain the electrically connected state. By sliding the cover 80 in the direction of arrow A1, the cover 80 is released from the locked state, and can be opened.

Referring to FIG. 12, the connector 7 includes an opening-operation part 82. The opening-operation part 82 is formed with a portion of the cover 80 to carry out opening operation thereof. The cover 80 is rotated about a pivot shaft 81 as a fulcrum, wherein the opening-operation part 82 that is a point close to the fulcrum serves as a power point, and the opening 80a for card insertion/removal that is a remote point opposite the fulcrum serves as an application point. The connector 7 allows easy insertion/removal of the IC card 9 and prevents disengagement thereof.

Referring to FIG. 12, a pair of grooves 85a and 85b are provided on both sides of the cover 80. The pair of grooves 85a and 85b serve to guide the IC card 9 when inserting/removing the IC card 9 into/from the cover 80. The pair of grooves 85a and 85b are obtained by bending a pair of side portions 85a and 85b inwardly, and have a C-shaped cross section. A pair of claws 86a and 86b for engaging the cover 80 to the housing 70 are provided to the pair of side portions 85a and 85b. The cover 80 includes an opening/closing assisting piece 87 that is an elastic material for assisting opening/closing of the cover 80.

FIG. 13 is a plan view showing an example of the IC card 9 applied to the connector disclosed in Patent Document 1, wherein the IC card is seen from the side of the connection terminals. Referring to FIG. 13, the IC card 9 is configured by accommodating an IC chip, not shown, in an insulative plastic casing 9b. The IC chip is connected to a plurality of metal foils stuck on the surface of the casing 9b. The metal foils having a plurality of divisions serve as connection terminals 9a of the IC card 9.

FIG. 14 is a plan view showing an example of an IC card 1 that is smaller than that shown in FIG. 13, wherein the IC card is seen from the side of the connection terminals. The small-sized IC card 1 shown in FIG. 14, for example, is a mini-UICC (Universal Integrated Circuit Card) that is called as a next-generation general-purpose IC card.

The small-sized IC card 1 shown in FIG. 14 has the same structure as that of the IC card 9 shown in FIG. 13. However, the external shape of a casing 1b of the IC card 1 is considerably smaller than that of the casing 9b of the IC card 9. On the other hand, the external shape of connection terminals 1a of the IC card 1 are merely slightly smaller than that of the connection terminals 9a of the IC card 9. Therefore, an insulation width t extending from both sides of the casing 1b to the connection terminals 1a (refer to FIG. 14) is smaller than an insulation width T extending from both sides of the casing 9b to the connection terminals 9a (refer to FIG. 13).

Typically, the cover 80 shown in FIG. 12 is obtained by forming a metal sheet, so that the IC card 1 having slight insulation width t shown in FIG. 14 has a problem that the plurality of connection terminals 1a may be short-circuited by the pair of grooves 85a and 85b. Thus, there is a demand for connectors of new structure that are also applicable to IC cards having greater percentage of the area occupied by a plurality of connection terminals with respect to the area of an insulative casing and a slim insulation width. This is a problem to be solved by the present invention.

SUMMARY OF THE INVENTION

The present invention is made in view of such a problem, and it is an object of the present invention to provide a connector of new structure in which even with an IC card having slim insulation width, a plurality of connection terminals will not be short-circuited by a metal cover for holding the IC card.

The inventors have found the fact that, in a connector including a metallic opening/closing cover having a pair of grooves, into/from which an IC card can slidably be inserted/removed, a short circuit of a plurality of connection terminals can be prevented from occurring by biasing, with the cover closed, the IC card toward the main surface of the cover by a plurality of contacts. Thus, the following connector of new structure has been invented.

In this specification, a first surface refers to a surface of an IC card on which a plurality of connection terminals are formed, and a second surface refers to a surface with which the main surface of the cover is contact with.

Also, in this specification a first end refers to one end at a side in which a cover and a housing are coupled with each other, a second end refers to the other end at a side into which the IC card is inserted, i.e. the side which is opposite to the first end.

According to a first aspect of the present invention, a connector is provided, including: a plurality of cantilever contacts electrically connected to a plurality of connection terminals formed on a first surface of an IC card; a substantially plate-like housing disposed with the plurality of cantilever contacts; and a box-like cover having a first end coupled to the housing in a reclosable manner and a second end into which the IC card can be inserted and stored, the cover includes a main surface covering a second surface of the IC card, the second surface including an insulated surface, and a pair of supports formed at both sides of the main surface and extending substantially parallel, the pair of supports being formed with a pair of rectangular grooves facing each other and serving to slidably guide both ends of the IC card and pairs of claws forming part of the pair of rectangular grooves and facing the main surface, wherein when closing the cover with respect to the housing, the IC card is biased by the plurality of cantilever contacts so that the first surface of the IC card separates from the pairs of claws.

According to the first aspect of the present invention, the connector includes a plurality of cantilever contacts, a plate-like housing, and a substantially box-like cover. The cantilever contacts are electrically connected to a plurality of connection terminals formed on a first surface of an IC card. The housing is disposed with the plurality of cantilever contacts. The cover has a first end coupled to the housing in a reclosable manner and a second end into which the IC card can be inserted and stored.

The cantilever contact is a contact in which a cantilever serves the same function as that of a spring. The cantilever contact has an electric conductivity, and can be formed in a desired shaped by forming a conductive metal plate. On the other hand, the housing has an insulative property. The insulative housing may be a housing formed of a non-conductive material, and can be shaped like a plate by molding of an engineering plastic.

The cantilever contact may be composed of a plate-like contact and include a stationary arm and an elastic arm, for example. Preferably, the elastic arm has a circular contact point formed at a distal end, and is inclined to rise from the stationary arm. The stationary arm is press-fit and fixed to the housing, and the cantilever contacts are disposed so that the contact points protrude from one surface of the housing. Then, the contact points can make contact with the plurality of connection terminals formed on the first surface of the IC card stored in the cover. A soldering part for soldering to a printed circuit board may be provided at a distal end of the stationary arm.

Preferably, accounting for the high degree of strength and an electromagnetic shield effect on an IC card, the cover is composed of a metal sheet, and can be shaped substantially like a box by stamping, bending, or drawing a developed metal sheet.

An opening for receiving an IC card is formed at the second end of the cover, and a stop wall for stopping the IC card at a predetermined position is provided at the first end of the cover. The stop wall may be a bend obtained by bending a first end of the main surface as will be described later.

With the configuration in which a pair of bends are provided at the first end of the cover at both wings (sides) of the main surface as will be described later, a pair of protrusions that face each other are provided to the pair of bends, and a pair of engagement holes for engaging with the pair of protrusions are formed at the first end of the housing in both side faces thereof, the cover and housing may be coupled in a reclosable manner with the pair of protrusions as center of rotation. Optionally, with the configuration in which a pair of protrusions that protrude from both side faces of the housing in opposite directions are provided at the first end of the housing, and a pair of engagement holes for engaging the pair of protrusions are formed in the pair of bends, the cover and housing may be coupled in a reclosable manner. The pair of engagement holes formed in the housing may communicate with a pair of guide grooves along which the cover can slide. The pair of engagement holes formed in the cover may be a pair of engagement holes along which the cover can slide.

According to the first aspect of the present invention, the cover includes a main surface and a pair of supports. The main surface covers the second surface with an insulated surface of the IC card in the state of being accommodated in the cover. The pair of supports are formed at both sides of the main surface to extend substantially parallel. A pair of rectangular grooves and pairs of claws are provided to the pair of supports. The pair of rectangular grooves are opposed to each other, and serve to slidably guide both ends of the IC card. The pairs of claws form part of the pair of rectangular grooves, and face the main surface.

The main surface is shaped substantially like a rectangle, and has substantially the same size as that of the housing. Inspection holes for confirming the insertion of the IC card may be formed in the main surface. Plate springs for biasing the IC card accommodated in the card toward the pairs of claws may be provided on the main surface. In order to prevent erroneous insertion of the IC card, a key including a bend may be provided at the first end of the main surface. Moreover, in order to easily hold and withdraw the IC card accommodated in the cover, a recess may be provided at a second end of the main surface.

The pair of supports are formed by bending both sides of the main surface like a C-shape, for example. The pair of supports themselves can serve to form the pair of rectangular grooves. The distance between the pair of supports corresponds to the external shape (width) of the IC card. On the other hand, the external shape of the main surface corresponds to that of the housing that is greater than the external shape of the IC card. The pair of supports are formed in the middle of the main surface, the main surface providing an I-shaped plane with both sides dented like a C-shape. Preferably, the pairs of claws are provided one and the other ends of the pair of supports, respectively.

The distance between the pair of rectangular grooves is slightly greater than the external shape of the IC card so that the IC card is slidably inserted. Preferably, the distance between the main surface and the pairs of claws is reasonably greater than the thickness of the IC card, so that the IC card is biased by the plurality of cantilever contacts to allow the first surface of the IC card to separate from the pairs of claws.

According to the first aspect of the present invention, when closing the cover with respect to the housing, the IC card is biased by the plurality of cantilever contacts to move to the main surface. Thus, the first surface of the IC card can separate from the pairs of claws.

In such a manner, according to the first aspect of the present invention, the connector includes a metallic opening/closing cover having a pair of grooves, into/from which an IC card can slidably be inserted/removed. A short circuit of a plurality of connection terminals through pairs of claws for supporting the IC card can be prevented from occurring by biasing, with the cover closed, the IC card toward the main surface of the cover by a plurality of contacts. The connector according to the present invention is applicable to an IC card having greater rate of the area of a plurality of connection terminals with respect to the area of an insulative casing and slim insulation width. Also, the connector according to the present invention is applicable to a typical IC card having relatively great insulation width. Preferably, in order to maintain the closed state of the cover, the connector includes a lock mechanism.

According to a second aspect of the connector as described in the first aspect of the present invention, the cover further includes a pair of engagement claws that can engage with both sides of the housing at a portion which is a predetermined distance from the second end of the cover, wherein when moving the cover from a state in which the cover is closed with respect to the housing to the side of the second end, the pair of engagement claws are engaged with the both sides of the housing to maintain a closed state of the cover, and the pairs of claws are engaged in the housing and are thus isolated from the first surface of the IC card by the housing.

According to the second aspect of the present invention, the cover further includes a pair of engagement claws that can engage with both sides of the housing at a portion which is a predetermined distance from the second end of the cover. When moving the cover from the state in which the cover is closed with respect to the housing to the side of the second end, the pair of engagement claws are engaged with both sides of the housing to maintain a closed state of the cover. Moreover, the pairs of claws are engaged in the housing and are thus isolated from the first surface of the IC card by the housing. The portion which is the predetermined distance from the second end is a portion in which the pair of engagement claws are disposed near the second end of the cover. Since the pair of engagement claws move toward the second end after the cover is closed, as long as the distance is sufficient enough for the engagement claws to engage, the length of the predetermined distance is not specifically limited.

The pair of engagement claws are formed by bending part of both sides of the main surface like a C-shape, for example. A pair of recesses (large recesses) are provided to the housing so as to avoid the pair of supports and the pair of engagement claws in the closed state. The pair of large recesses are provided in the middle of the housing, the housing providing an I-shaped plane with both sides dented like a C-shape. Moreover, a plurality of C-shaped escape holes (small recesses) are provided at both sides of the pair of large recesses so as to avoid the pairs of claws when the cover is in the closed state.

A pair of steps communicating with the pair of recesses are provided at the side of a second end of the housing. When moving the cover from the state in which the cover is closed with respect to the housing to the side of the second end, the pair of engagement claws are engaged with the pair of steps to allow maintaining of the closed state of the cover. Then, the locked state can be maintained in such a manner that the pair of engagement claws hold both sides of the housing at the second end thereof. When moving the cover to the side of the first end, the locked state is released to allow returning to the open state of the cover with respect of the housing.

Moreover, a plurality of steps communicating with the plurality of escape holes (small recesses), are provided, respectively, in the middle of the housing. When moving the cover from the state in which the cover is closed with respect to the housing to the side of the second end, the pairs of claws are engaged in the plurality of steps, and are thus isolated from the first surface of the IC card by the housing.

According to the third aspect of the connector as described in the first or the second aspect of the present invention, the housing is mounted on a surface of a printed circuit board.

A soldering part for soldering to a printed circuit board is provided at a distal end of the stationary arm of the cantilever contact. The housing disposed with the plurality of cantilever contacts is mounted on the surface of the printed circuit board. The joining strength of the housing with respect to the printed circuit board may be complemented by press-fitting a pair of reinforcement tabs into the housing and soldering the reinforcement tabs to the printed circuit board.

According to a fourth aspect of the present invention, a cellular phone is provided, including the connector according to any one of the first to third aspects of the present invention.

According to the present invention, the connector includes a metallic opening/closing cover having a pair of grooves, into/from which an IC card can slidably be inserted/removed, a short circuit of a plurality of connection terminals through pairs of claws for supporting the IC card can be prevented from occurring by biasing, with the cover closed, the IC card toward the main surface of the cover by a plurality of contacts. The connector according to the present invention is applicable to an IC card having greater rate of the area of a plurality of connection terminals with respect to the area of an insulative casing and slim insulation width. Also, the connector according to the present invention is applicable to a typical IC card having relatively great insulation width.

DETAILED DESCRIPTION OF THE INVENTION

Figure 1:
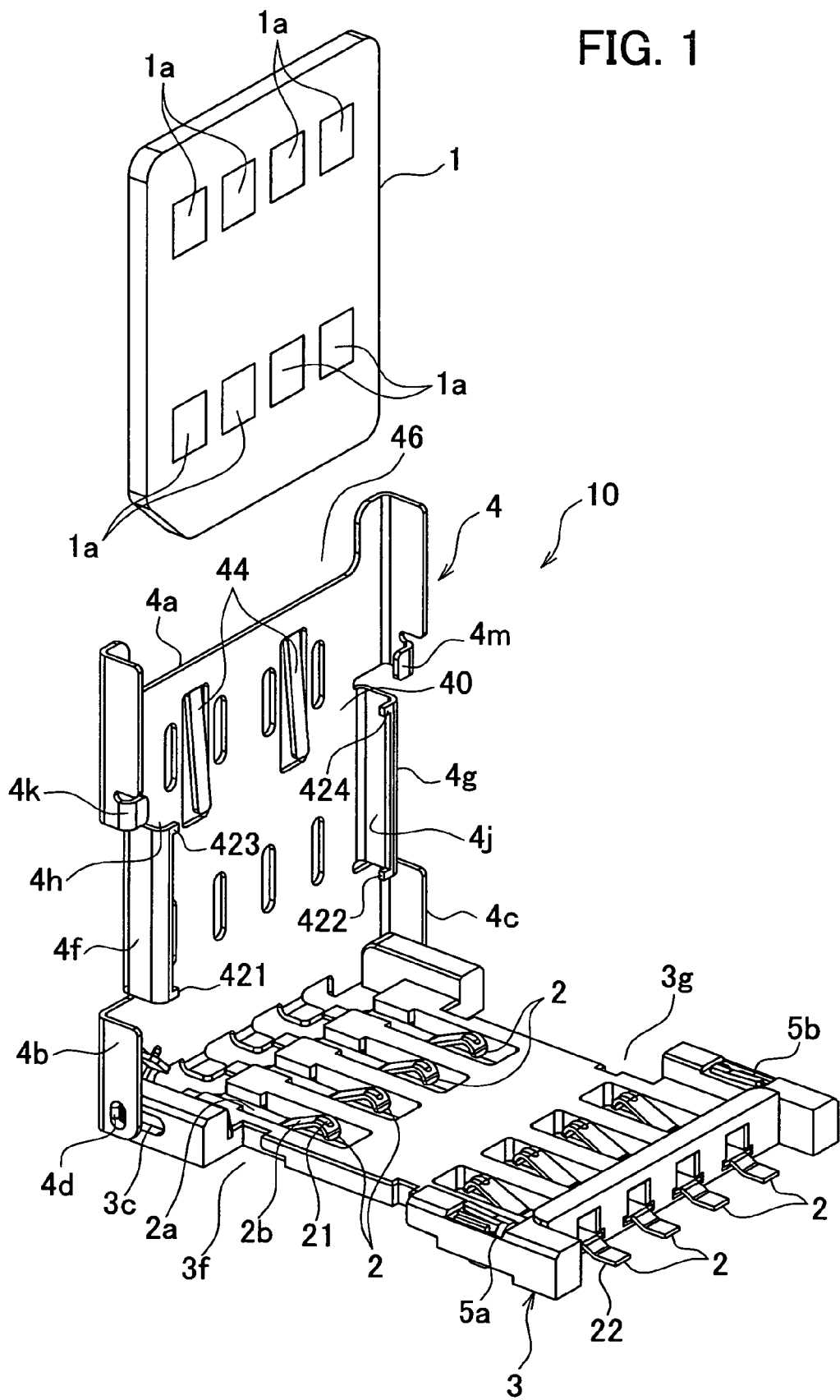
FIG. 1 is a perspective external view showing a configuration of an embodiment of a connector according to the present invention.

Referring to the drawings, the best mode for carrying out the invention is described hereafter.

Figure 2:
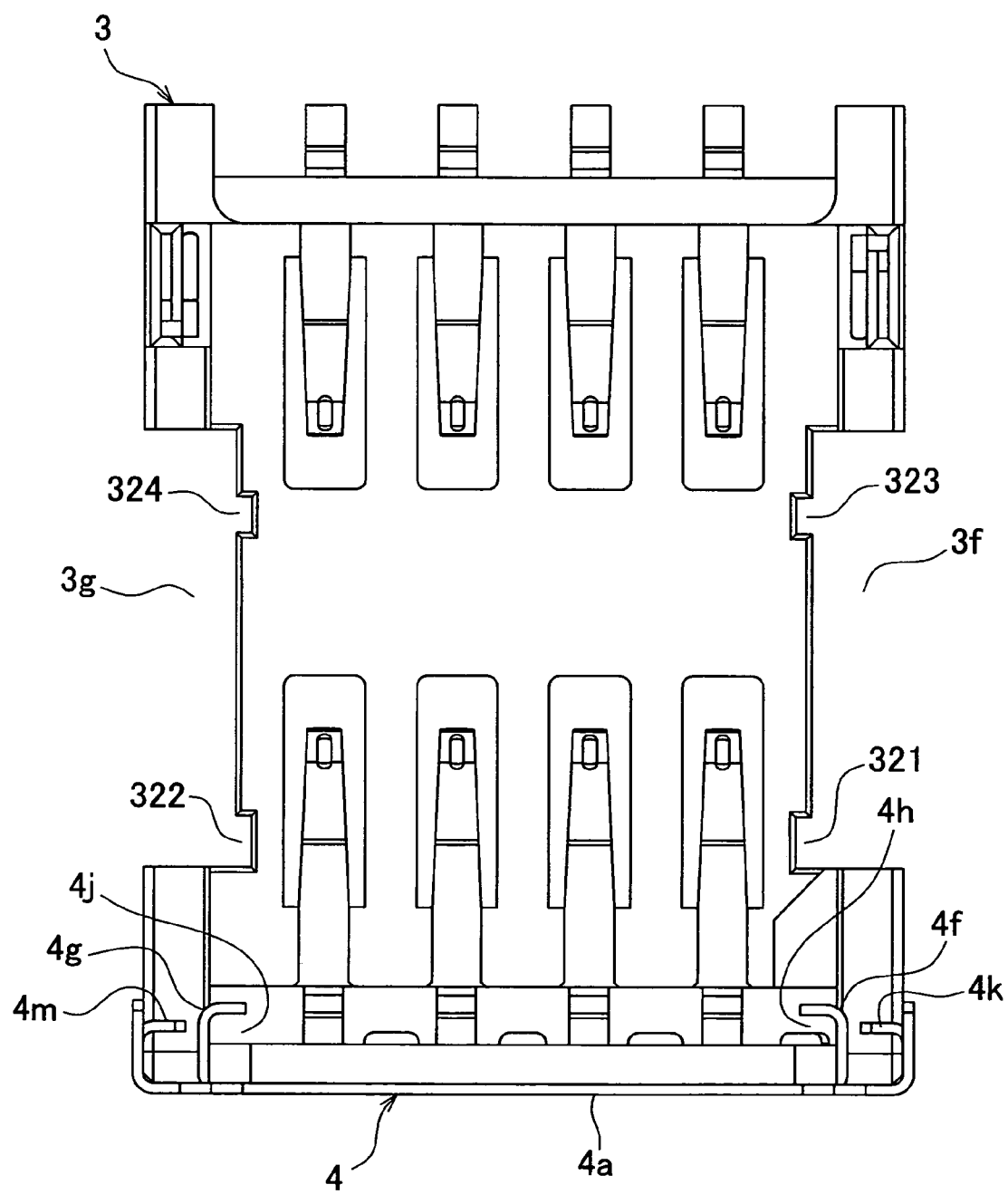
FIG. 2 is a plan view showing the connector in the embodiment.
Figure 3:
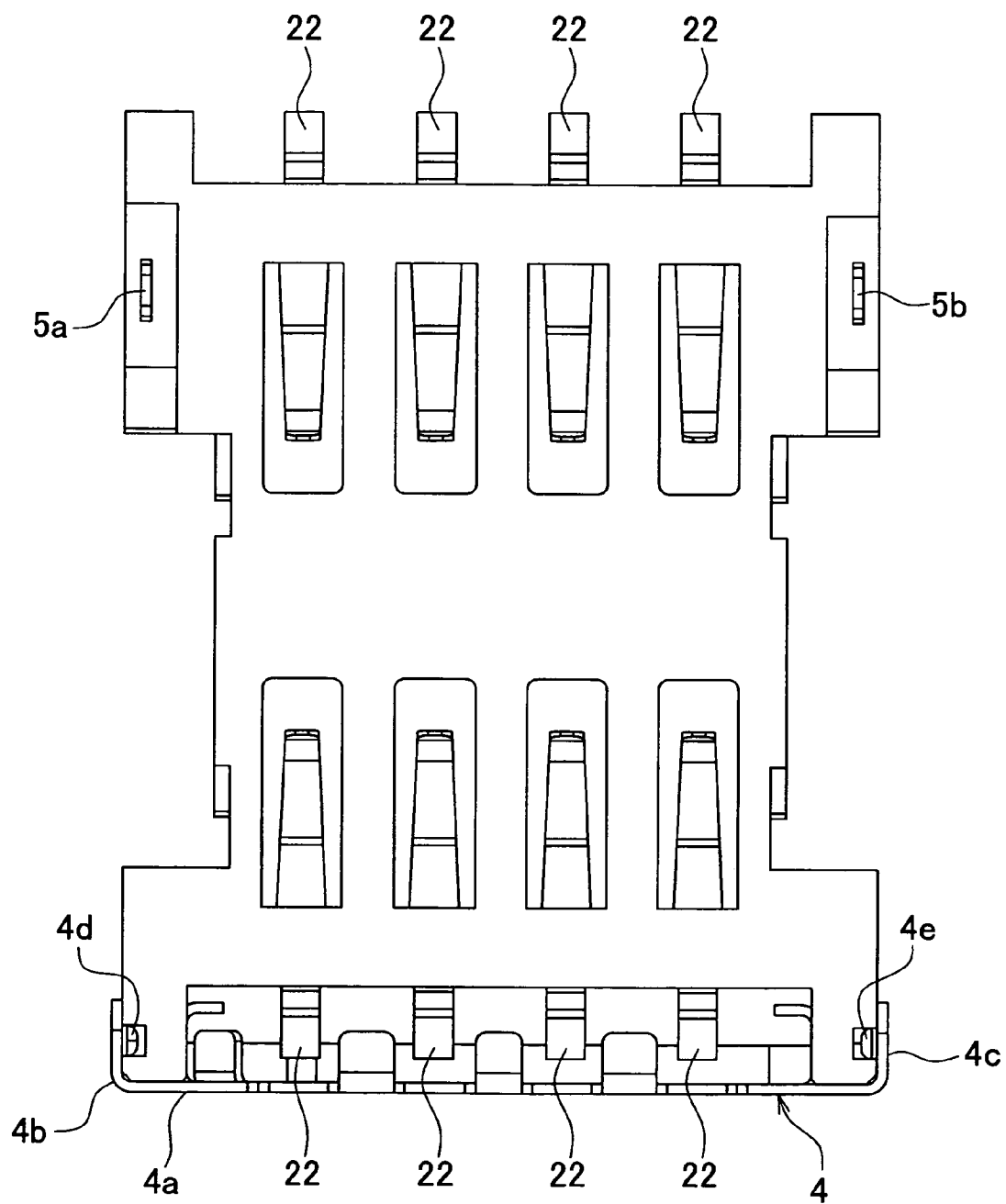
FIG. 3 is a bottom view showing the connector in the embodiment.
Figure 4:
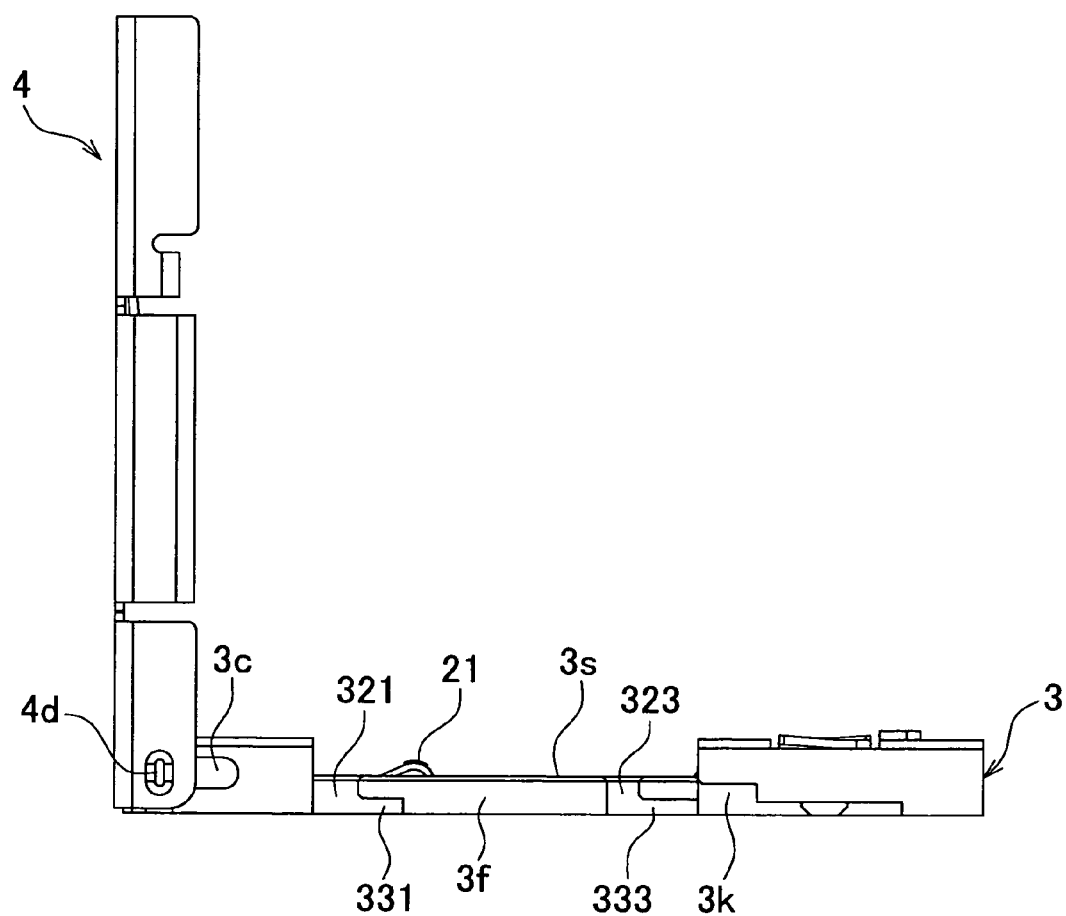
FIG. 4 is a left side view showing the connector in the embodiment.
Figure 5:
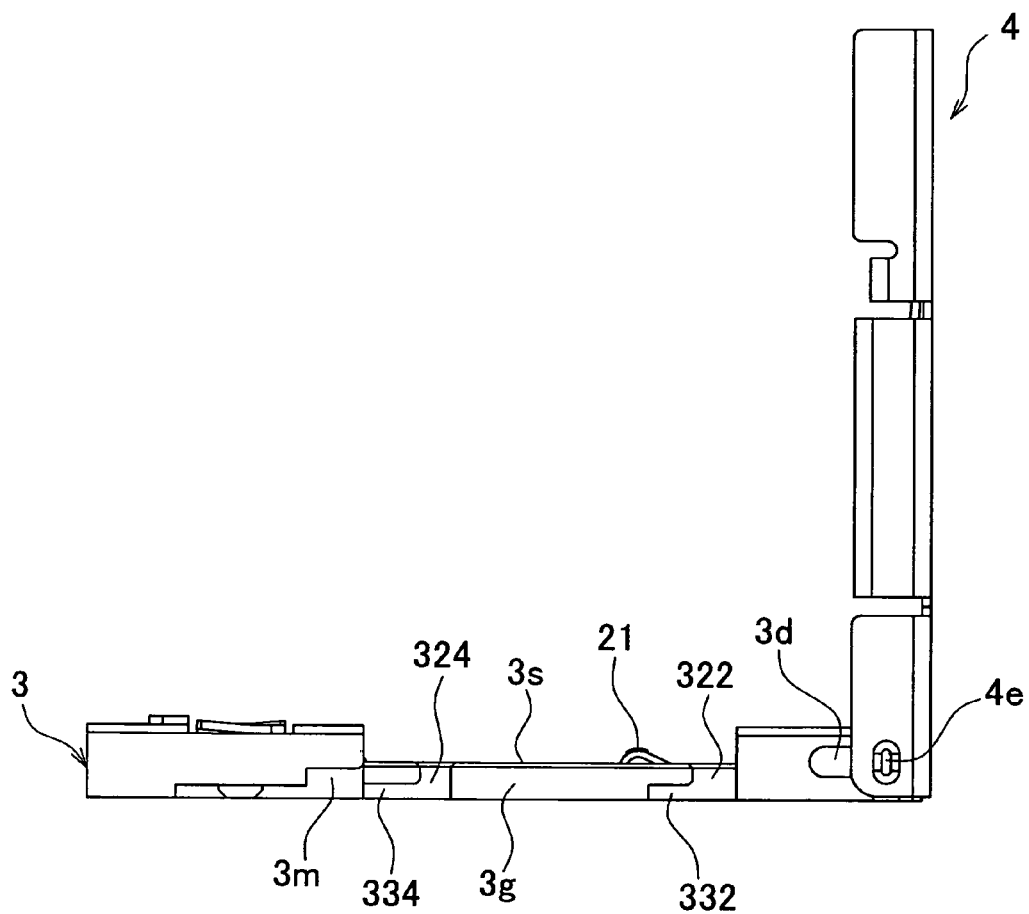
FIG. 5 is a right side view showing the connector in the embodiment.

FIG. 1 is a perspective external view showing a configuration of an embodiment of a connector according to the present invention, with a cover opened. FIG. 2 is a plan view showing the connector in the embodiment. FIG. 3 is a bottom view showing the connector in the embodiment. FIG. 4 is a left side view showing the connector in the embodiment. FIG. 5 is a right side view showing the connector in the embodiment.

Figure 6:
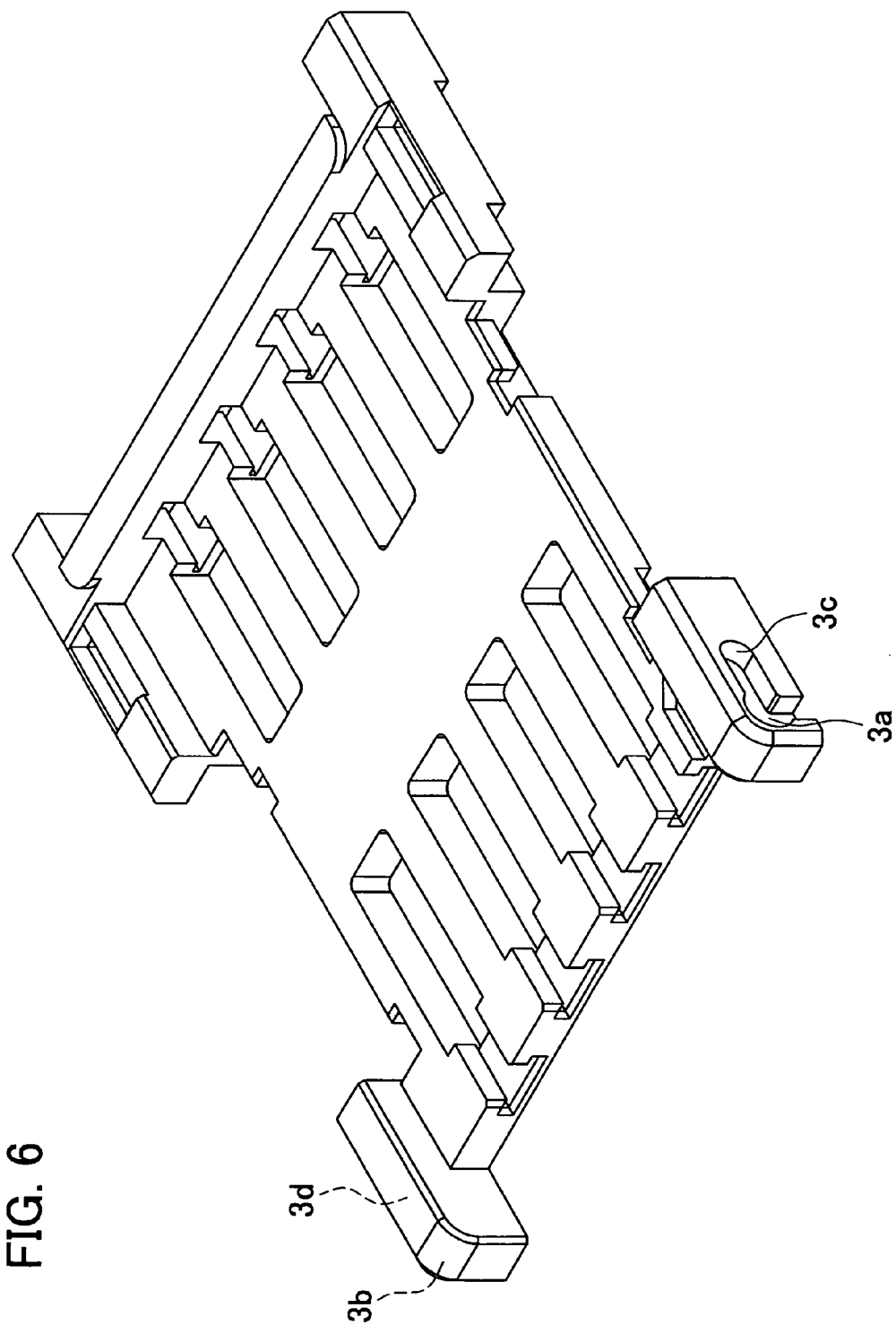
FIG. 6 is a perspective external view showing a housing of the connector in the embodiment.
Figure 7:
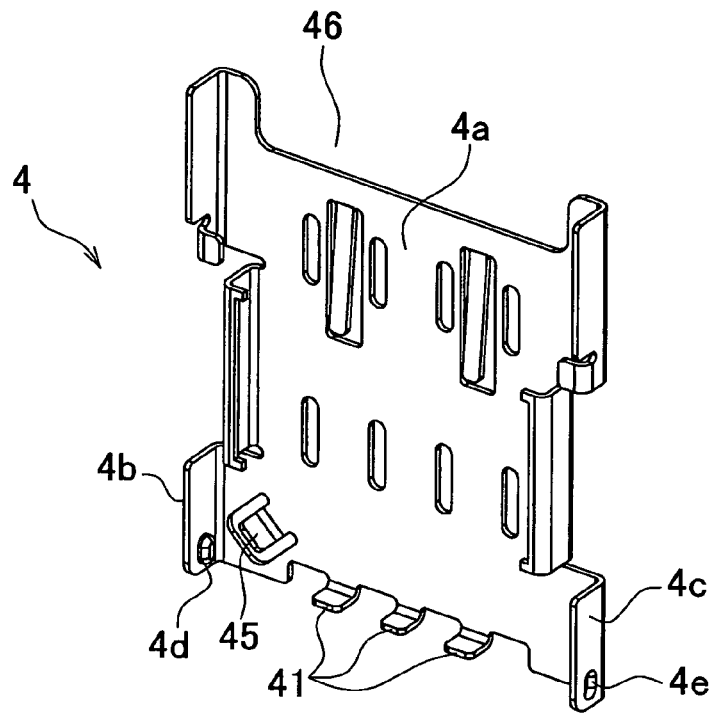
FIG. 7 is a perspective external view showing a cover of the connector in the embodiment.
Figure 8:
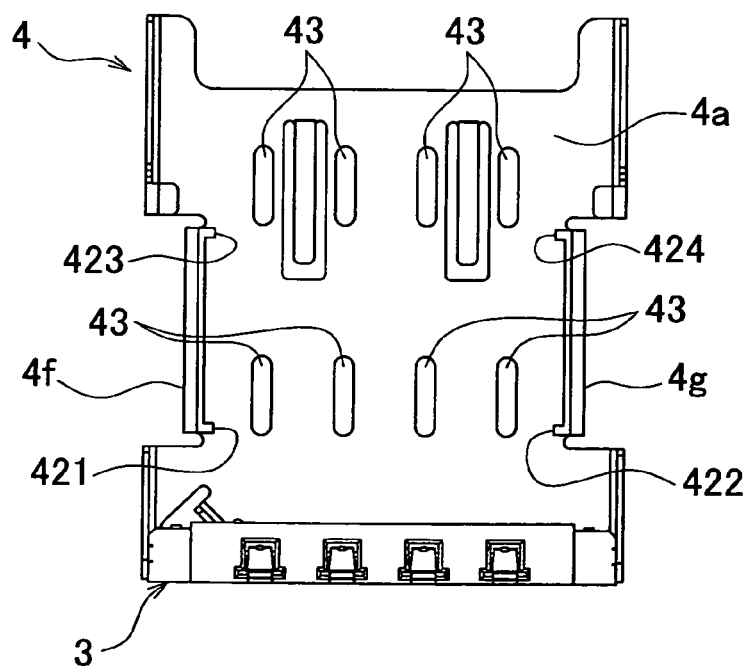
FIG. 8 is a front view showing the connector in the embodiment.

FIG. 6 is a perspective external view showing a housing of the connector in the embodiment. FIG. 7 is a perspective external view showing a cover of the connector in the embodiment. FIG. 8 is a front view showing the connector in the embodiment, with the cover opened.

Figure 9A:
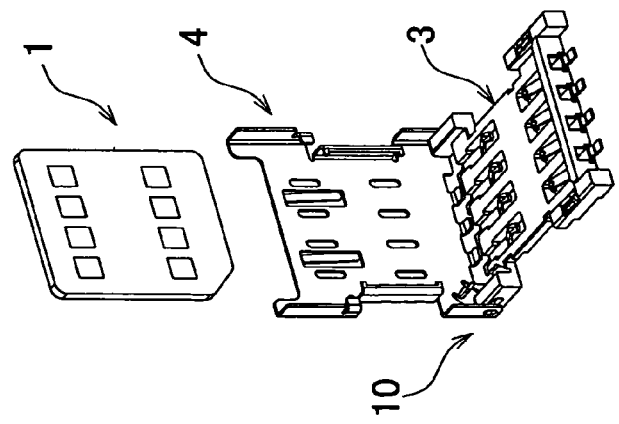
FIGS. 9A to 9D are diagrams showing a procedure of mounting an IC card to the connector in the embodiment.
Figure 9B:
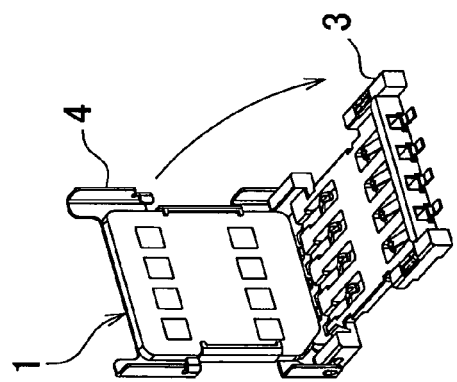
Figure 10A:
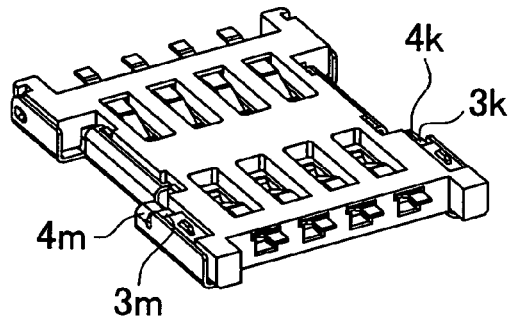
FIGS. 10A and 10B are diagrams showing a state of the connector in the embodiment before locking.
Figure 10B:
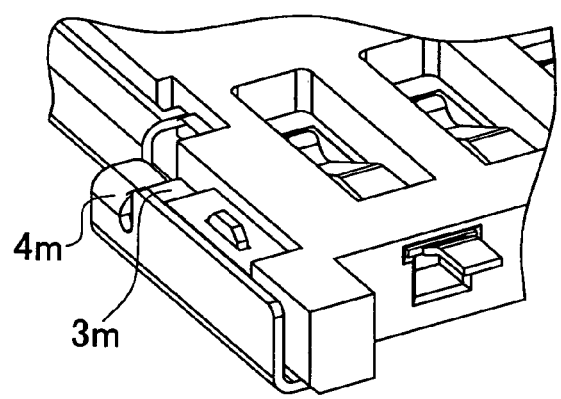
Figure 11A:
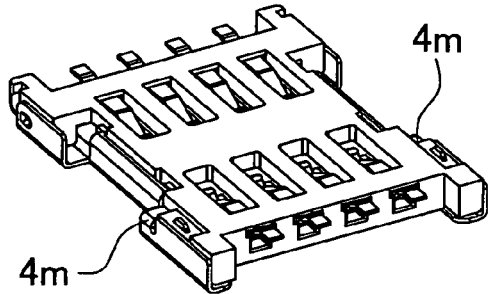
FIGS. 11A and 11B are diagrams showing a state in which the connector in the embodiment is locked.
Figure 11B:
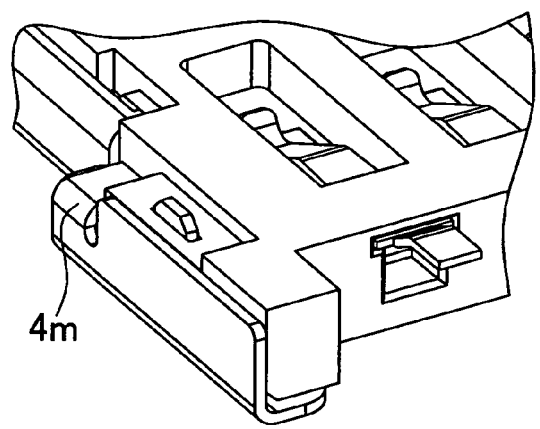
Figure 12:
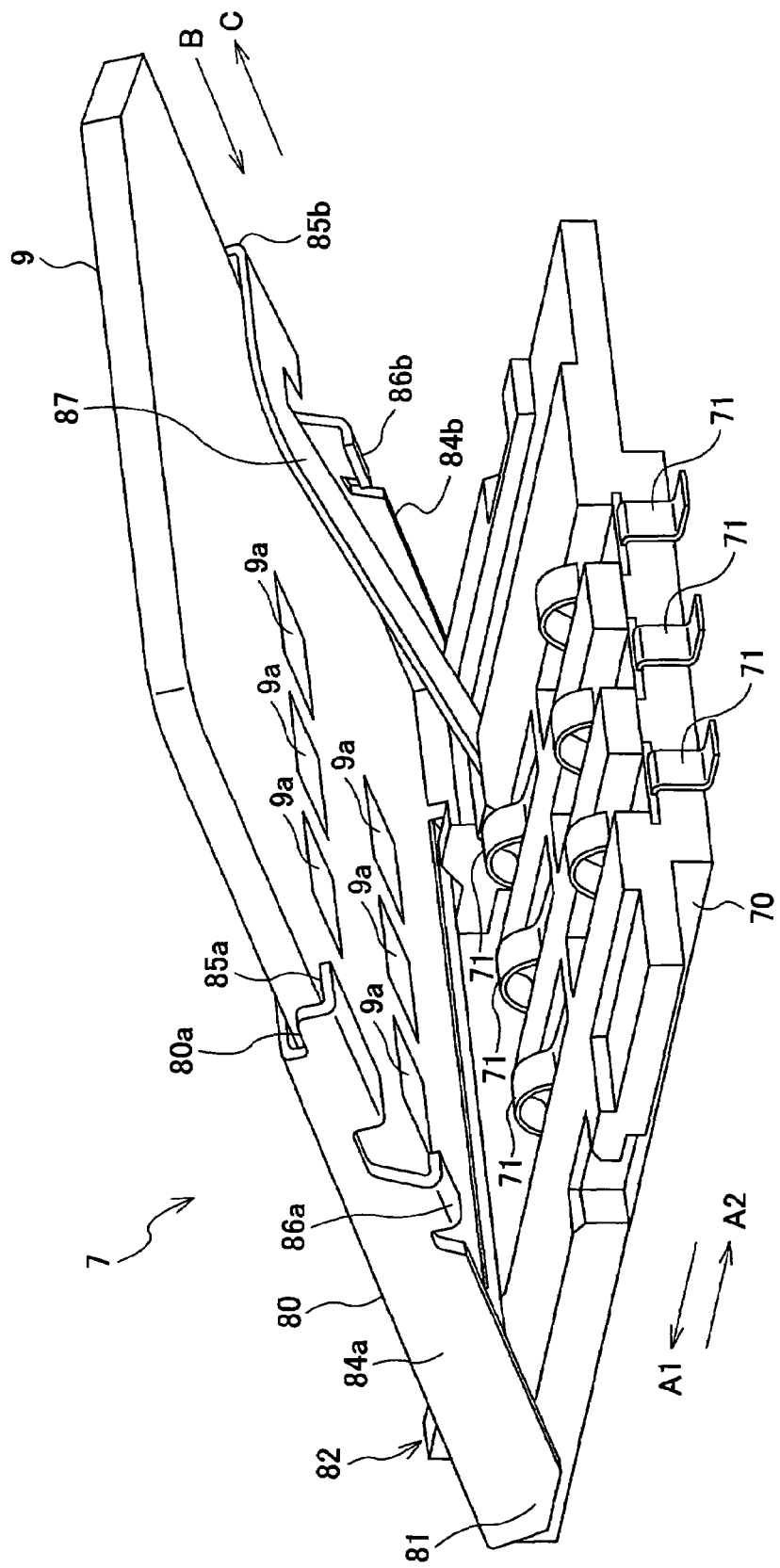
FIG. 12 is a perspective external view showing an example of a related-art connector with a cover opened.

FIGS. 9A to 9D are diagrams showing a procedure of mounting an IC card to the connector in the embodiment. FIGS. 10A and 10B are diagrams showing a state of the connector in the embodiment before locking, wherein FIG. 10A is a perspective external view of the connector in the embodiment as seen from the bottom, and FIG. 10B is an enlarged fragmentary view showing a main part of FIG. 10A. FIGS. 11A and 11B are diagrams showing a state in which the connector in the embodiment is locked, wherein FIG. 11A is a perspective external view of the connector in the embodiment as seen from the bottom, and FIG. 11B is an enlarged fragmentary view showing a main part of FIG. 11A.

First, the configuration of a connector 10 according to the present invention is described. Referring to FIG. 1, the connector 10 includes a plurality of cantilever contacts (refer hereafter to as contacts simply) 2, a plate-like housing 3, and a roughly box-like cover 4. The contacts 2 are electrically connected to a plurality of connection terminals 1a formed on a first surface of an IC card 1. The housing 3 is provided with the plurality of contacts 2. The cover 4 has the first end coupled to the housing 3 in a reclosable manner. The IC card 1 can be inserted into a second end of the cover 4 for storage.

Referring to FIG. 1, the contact 2 is a contact in which a cantilever serves the same function as that of a spring, and is obtained by forming a conductive metal plate. The housing 3 is molded out of an engineering plastic having insulativity. Referring to FIG. 1, the contact 2 is composed of a plate-like contact, and includes a stationary arm 2a and an elastic arm 2b. The elastic arm 2b has a circular contact point 21 formed at a distal end, and is inclined to rise from the stationary arm 2a. The stationary arm 2a is press-fit and fixed to the housing 3. Referring to FIGS. 4 and 5, the housing 3 is provided with the contacts 2 so that the contact points 21 protrude from one surface 3s of the housing 3. Referring to FIG. 3, a soldering part 22 for soldering to a printed circuit board, not shown, is formed at a distal end of the stationary arm 2a.

Referring to FIG. 1, the cover 4 is composed of a metal sheet, and is shaped roughly like a box by stamping, bending, or drawing a developed metal sheet. An opening 40 for receiving the IC card 1 is formed at the second end of the cover 4, and a stop wall for stopping the IC card 1 at a predetermined position is provided at the first end of the cover 4. Referring to FIG. 7, the stop wall includes a plurality of discontinuous bends 41 obtained by bending one end of a main surface 4a.

Referring to FIG. 1, a pair of bends 4b and 4c are provided at the side of the first end of the cover 4 at both sides of the main surface 4a. Referring to FIG. 3, a pair of protrusions 4d and 4e that are on opposite side of the cover are provided to the pair of bends 4b and 4c. On the other hand, referring to FIG. 6, a pair of engagement holes 3a and 3b for engaging with the pair of protrusions 4d and 4e are formed at the first) end of the housing 3 in both side faces thereof. The cover 4 is coupled to the housing 3 in a reclosable manner with the pair of protrusions 4d and 4e as center of rotation. Referring to FIGS. 4 and 5 or FIG. 6, the pair of engagement holes 3a and 3b formed in the housing 3 communicate with a pair of guide grooves 3c and 3d along which the cover 4 can move to the side of the other end.

Referring to FIG. 1, the cover 4 includes main surface 4a and a pair of supports 4f and 4g. The main surface 4a covers the second surface which has an insulated surface of the IC card 1in the state of being stored in the cover 4. The pair of supports 4f and 4g are formed at both sides of the main surface 4a to extend roughly parallel. A pair of rectangular grooves 4h and 4j and pairs of claws 421 to 424 are provided to the pair of supports 4f and 4g. The pair of rectangular grooves 4h and 4j are opposite to each other, and serve to slidably guide both ends of the IC card 1. The pairs of claws 421 to 424 form part of the pair of rectangular grooves 4h and 4j, and face the main surface 4a. The pairs of claws 421-424 and the bottom parts of the pair of rectangular grooves 4h, 4j are in a same plane.

Referring to FIG. 1, the main surface 4a is shaped roughly like a rectangle, and has roughly the same size as that of the housing 3. Referring to FIG. 8, a plurality of inspection holes 43 for confirming insertion of the IC card 1 are formed in the main surface 4a. Moreover, a plurality of plate springs 44 for biasing the IC card 1 stored in the cover 4 toward the pairs of claws 421 to 424 are provided on the main surface 4a. Referring to FIG. 7, in order to prevent erroneous insertion of the IC card 1, a key 45 including a bend is provided at one end of the main surface 4a. In order to facilitate holding and drawing of the IC card 1 stored in the cover 4, a recess 46 is provided at the second end of the main surface 4a.

Referring to FIG. 2, the pair of supports 4f and 4g are formed by bending both sides of the main surface 4a like a C-shape. The pair of supports 4f and 4g themselves serve to form the pair of rectangular grooves 4h and 4j. The distance between the pair of supports 4f and 4g corresponds to the external shape (width) of the IC card 1. On the other hand, the external shape of the main surface 4a corresponds to that of the housing 3 that is greater than the external shape of the IC card 1. Referring to FIG. 8, the pair of supports 4f and 4g are formed in the middle of the main surface 4a, the main surface 4a providing an I-shaped plane with both sides dented like a C-shape. The pairs of claws 421 to 424 are provided at one end and the other end of the pair of supports 4f and 4g, respectively.

Referring to FIG. 1, the distance between the pair of rectangular grooves 4h and 4j is slightly greater than the external shape (width) of the IC card 1 so that the IC card 1 is slidably inserted. The distance between the main surface 4a and the pairs of claws 421 to 424 is reasonably greater than the thickness of the IC card 1 so that the IC card 1 is biased by the plurality of contacts 2 to allow the first surface (surface on which the plurality of connection terminals 1a are formed) of the IC card 1 to separate from the pairs of claws 421 to 424.

Referring to FIG. 1, the connector 10 includes at the second end of the cover 4 a pair of engagement claws 4k and 4m that can engage with both sides of the housing 3. When moving the cover 4 from the state in which the cover 4 is closed with respect to the housing 3 to the side of the second end, the pair of engagement claws 4k and 4m are engaged with the housing 3 to allow maintaining of the closed state of the cover 4. Moreover, the pairs of claws 421 to 424 are engaged in the housing 3, and are thus isolated from one surface of the IC card 1 by the housing 3.

Referring to FIG. 2, the pair of engagement claws 4k and 4m are formed by bending part of both sides of the main surface 4a like a C-shape. On the other hand, a pair of large recesses 3f and 3g are provided to the housing 3 so as to avoid the pair of supports 4f and 4g and the pair of engagement claws 4k and 4m in the closed state of the cover 4. As shown in FIG. 2, the pair of large recesses 3f and 3g are provided in the middle of the housing 3, the housing 3 providing an I-shaped plane with both sides dented like a C-shape. Moreover, a plurality of C-shaped escape holes (small recesses) 321 to 324 are provided at both sides of the pair of large recesses 3f and 3g so as to avoid the pairs of claws 421 to 424 in the closed state of the cover 4.

In this embodiment, the pair of engagement claws 4m, 4k are provided adjacent to the large recesses respectively. On the other hand, referring to FIGS. 4 and 5, a pair of steps 3k and 3m communicating with the pair of recesses 3f and 3g are provided near the second end of housing 3. When moving the cover 4 from the state in which the cover 4 is closed with respect to the housing 3 to the side of the second end, the pair of engagement claws 4k and 4m are engaged in the pair of steps 3k and 3m to allow maintaining of the closed state of the cover 4. The locked state can be maintained in such a manner that the pair of engagement claws 4k and 4m hold both sides of the housing 3 near the second end thereof. When moving the cover 4 to the side of first end, the locked state is released to allow returning to the open state of the cover 4 with respect of the housing 3.

As shown in FIG. 4, the cover slides the distance which corresponds to a longitudinal length of internal gauge of guide grooves 3c and 3d. Therefore, the aforementioned steps 3k, 3m, and 331 to 334 has the same length of recesses forming those steps, such that the cover slides and the engagement claws 4k and 4m and the pair of claws 421 to 424 can slide.

Referring to FIGS. 4 and 5, a plurality of steps 331 to 334 communicating with the plurality of escape holes (small recesses) 321 to 324, respectively, are provided in the middle of the housing 3. When moving the cover 4 from the state in which the cover 4 is closed with respect to the housing 3 to the side of the second end, the pairs of claws 421 to 424 are engaged in the plurality of steps 331 to 334, and are thus isolated from one surface of the IC card 1 by the housing 3.

The connector 10 is mounted on the surface of a printed circuit board, not shown, built in a cellular phone, for example. As described above, the soldering part 22 for soldering to the printed circuit board is provided at a distal end of the stationary arm 2a of the contact 2, achieving surface mounting of the connector 10. As shown in FIG. 1, the connector 10 includes a pair of reinforcement tabs 5a and 5b. The pair of reinforcement tabs 5a and 5b are press-fit into the housing 3, and can complement a joining strength of the connector 10 with respect to the printed circuit board through the bottom of the pair of reinforcement tabs 5a and 5b soldered to the printed circuit board.

Next, the procedure of installing the IC card 1 in the connector 10 is described. FIG. 9A is a diagram showing a state in which the cover 4 is open with respect to the housing 3 so as to insert the IC card 1 into the cover 4. FIG. 9B is a diagram showing a state in which the IC card 1 is inserted and stored in the cover 4. In the state shown in FIG. 9B, the connection terminals 1a (refer to FIG. 14) of the IC card 1 may make contact with the pairs of claws 421 to 424 (refer to FIG. 1).

Figure 9C:
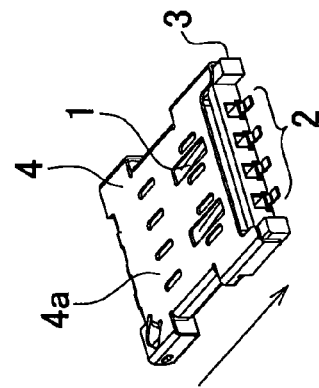

Then, when rotating the cover 4 clockwise for closing, the state shown in FIG. 9C is obtained. In the state shown in FIG. 9C, a short circuit of the plurality of connection terminals 1a through the pairs of claws 421 to 424 (refer to FIG. 1) can be prevented from occurring by biasing, with the cover 4 closed, the IC card 1 toward the main surface 4a of the cover 4 by the plurality of contacts 2. It is to be noted that the pressing force of the plurality of plate springs 44 (refer to FIG. 1) is very smaller than the total of the biasing forces of the plurality of contacts 2, causing no interference of movement of the IC card 1 toward the main surface 4a. Moreover, in the state shown in FIG. 9C, referring to FIG. 10A, the pair of engagement claws 4k and 4m face the pair of steps 3k and 3m.

Figure 9D:
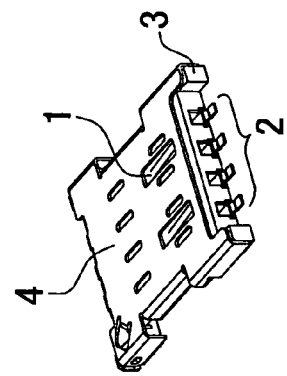

Then, when moving the cover 4 to the side of the second end, the state shown in FIG. 9D is obtained. In the state shown in FIG. 9D, referring to FIG. 11A, the pair of engagement claws 4k and 4m are engaged in the pair of steps 3k and 3m (refer to FIGS. 4 and 5) to allow maintaining of the closed state of the cover 4. In the state shown in FIGS. 9D and 11A, the pairs of claws 421 to 424 (refer to FIG. 1) are engaged in the plurality of steps 331 to 334 (refer to FIGS. 4 and 5), and thus are isolated from the first surface of the IC card 1 by the housing 3. In such a manner, with the connector according to the present invention, the pairs of claws for supporting the IC card are surely insulated by the housing.

Figure 13:
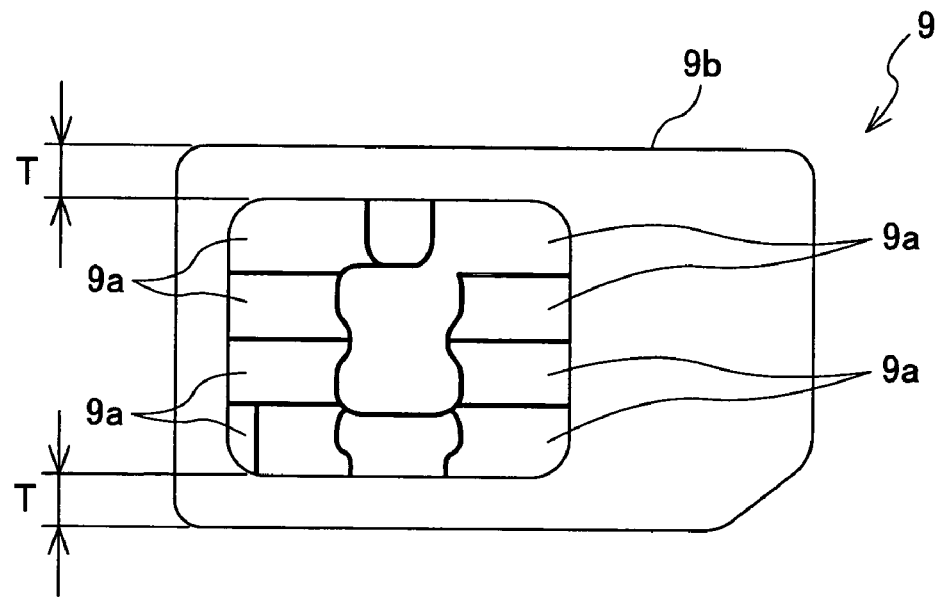
FIG. 13 is a plan view showing an example of an IC card applied to the related-art connector.
Figure 14:
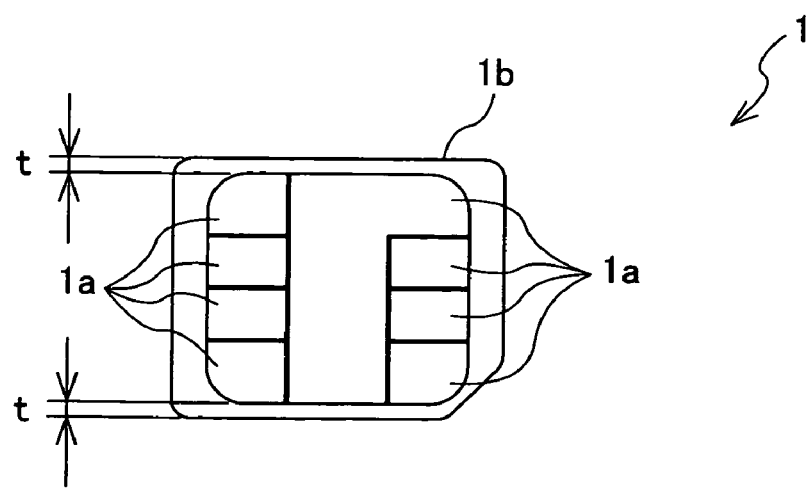
FIG. 14 is a plan view showing an example of an IC card that is smaller than that shown in FIG. 13.

The connector according to the present invention includes a metallic opening/closing cover having a pair of grooves, into/from which an IC card can slidably be inserted/removed, a short circuit of a plurality of connection terminals through pairs of claws for supporting the IC card can be prevented from occurring by biasing, with the cover closed, the IC card toward the main surface of the cover by a plurality of contacts. The connector according to the present invention is applicable to an IC card having greater rate of the area of a plurality of connection terminals with respect to the area of an insulative casing and slim insulation width, as shown in FIG. 14. Also, the connector according to the present invention is applicable to a typical IC card having relatively great insulation width, as shown in FIG. 13.

While the preferred embodiment of the present invention has been described and illustrated above, it is to be understood that the preferred embodiment is exemplary of the invention and is not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

What is claimed is:

1. A connector, comprising:
   a plurality of cantilever contacts electrically connected to a plurality of connection terminals formed on a first surface of an IC card;
   a substantially plate-like housing disposed with the plurality of cantilever contacts; and
   a box-like cover having a first end coupled to the housing in a reclosable manner and a second end into which the IC card is inserted and stored, wherein
   the cover comprises a main surface covering a second surface of the IC card, the second surface including an insulated surface, and a pair of supports formed at both sides of the main surface and extending substantially parallel, the pair of supports is formed with a pair of rectangular grooves which are opposed to each other to slidably guide both ends of the IC card, and pairs of claws forming bottom parts of the pair of rectangular grooves and facing the main surface, wherein the pairs of claws and the bottom parts of the pair of rectangular grooves are in a same plane, and when closing the cover with respect to the housing, the IC card being biased by the plurality of cantilever contacts, the bottom parts of the pair of rectangular grooves are spaced downward from a top surface of the housing by the pairs of claws engaged with steps provided in the housing so that the first surface of the IC card separates from the pairs of claws.

2. The connector according to claim 1, wherein the cover further comprises a pair of engagement claws that can engage with both sides of the housing at a portion which is a predetermined distance from the second end of the cover, wherein when moving the cover from a state in which the cover is closed with respect to the housing to the side of the second end, the pair of engagement claws are engaged with the both sides of the housing to maintain the closed state of the cover, and the pairs of claws are engaged in the housing and are thus isolated from the first surface of the IC card by the housing.

3. The connector according to claim 1, wherein the housing is mounted on a surface of a printed circuit board.

4. The connector according to claim 2, wherein the housing is mounted on a surface of a printed circuit board.

5. A cellular phone, comprising the connector according to claim 1.

6. A cellular phone, comprising the connector according to claim 2.

7. A cellular phone, comprising the connector according to claim 3.

8. A connector for an IC card, comprising:

a housing;

a cover which provides an insertion space for the IC card, movably attached to the housing, and including a pair of supports formed at both sides thereof; and a plurality of cantilever contacts provided in the housing, the cantilever contacts electrically connected to a plurality of connections formed on a surface of the IC card, wherein the pair of supports has a pair of rectangular grooves slidably guiding the IC card, and pairs of claws each forming a bottom portion of a groove, wherein the pairs of claws and the bottom parts of the pair of rectangular grooves are in a same plane, and when closing the cover with respect to the housing, the plurality of cantilever contacts bias the IC card, and the pairs of claws engaged with a plurality of steps provided in the housing allow the surface of the IC card to be spaced from the pairs of claws.

9. The connector according to claim 8, wherein the cover further comprises a pair of engagement claws that can engage with both sides of the housing.

10. The connector according to claim 9, wherein the housing is mounted on a surface of a printed circuit board.

11. The connector according to claim 8, wherein the housing is mounted on a surface of a printed circuit board.

12. The connector according to claim 8, wherein the cover is made of metal.

13. A cellular phone, comprising the connector according to claim 8.

14. A cellular phone, comprising the connector according to claim 9.

15. A cellular phone, comprising the connector according to claim 10.

\* \* \* \* \*